June 20, 1944. G. E. COATES 2,351,926
HAY RAKE AND STACKER
Filed April 30, 1942 2 Sheets-Sheet 1
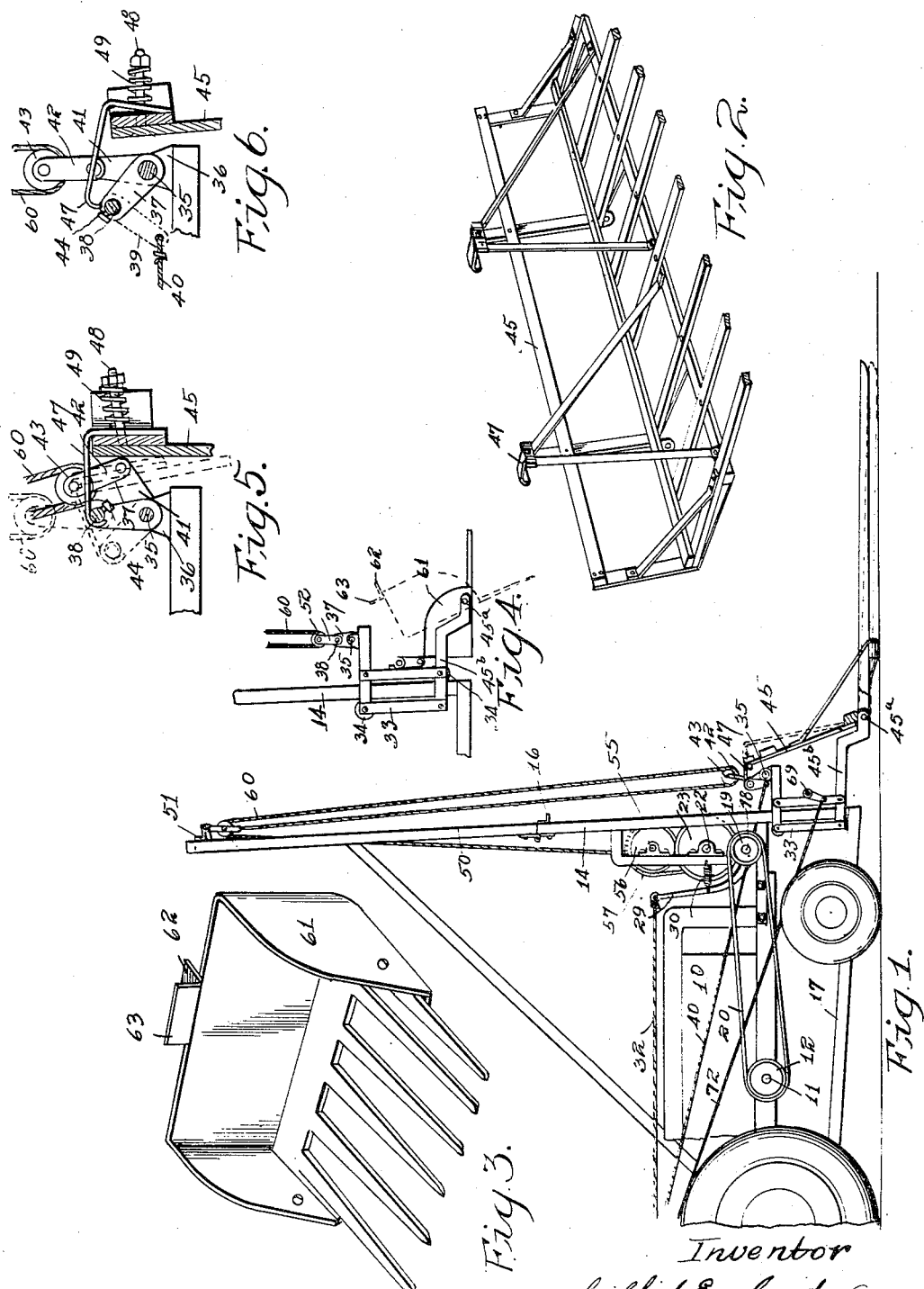
Inventor
Gilbert E. Coates June 20, 1944.　　　G. E. COATES　　　2,351,926
HAY RAKE AND STACKER
Filed April 30, 1942　　　2 Sheets-Sheet 2

Inventor
Gilbert E. Coates
by Orwig & Hague
Attys

Patented June 20, 1944

2,351,926

UNITED STATES PATENT OFFICE 2,351,926

HAY RAKE AND STACKER

Gilbert E. Coates, Laurens, Iowa

Application April 30, 1942, Serial No. 441,134

3 Claims. (Cl. 214—113)

My invention relates to that class of hay rakes and stackers which are adapted to be carried by and operated by power from a tractor.

My object is to provide a device of this class in which an operator seated on the driver's seat of the tractor may, by the manipulation of a single lever, cause the rake to be elevated and upon release of said lever the rake is automatically stopped and also firmly secured in such position to thereby avoid the possibility of having the rake fall due to accident or mistake on the part of the operator, and further in this connection to provide for complete control of the lowering movement of the rake by operation of the same lever.

A further object is to provide a device of this class in which during the operation as a rake the rake teeth are permitted to have a limited tilting movement to accommodate themselves to irregularities in the ground surface, and to be automatically moved to position with their front ends at their maximum elevation upon the application of power for raising the rake, to thereby prevent the load from slipping forwardly off the rake, and further in this connection to provide means whereby after the rake has been dumped and returned to the ground surface it may be automatically returned to its position for said limited tilting movement.

A further object is to provide a device of this class especially adapted for use either as a hay rake and stacker or as a manure loader, and in this connection it is my object to provide simple and easily operated means for removing the hay rake and substituting a manure loader scoop, without altering or disturbing the remainder of the device.

In the accompanying drawings—

Figure 1 shows a side elevation of my improved device applied to a tractor;

Figure 2 shows a perspective view of the hay rake detached;

Figure 3 shows a perspective view of the manure loader scoop detached;

Figure 4 shows a detail side view of the rake and portions of the guiding and supporting frame. The dotted lines show the rake in dumping position;

Figure 5 shows an enlarged detail sectional view of a part of the rake upright member and the adjacent portion of the rake-supporting carriage. The dotted lines show the positions of the parts when the rake teeth are at their upper limit;

Figure 6 shows a similar view with the parts released for dumping;

Figure 7:
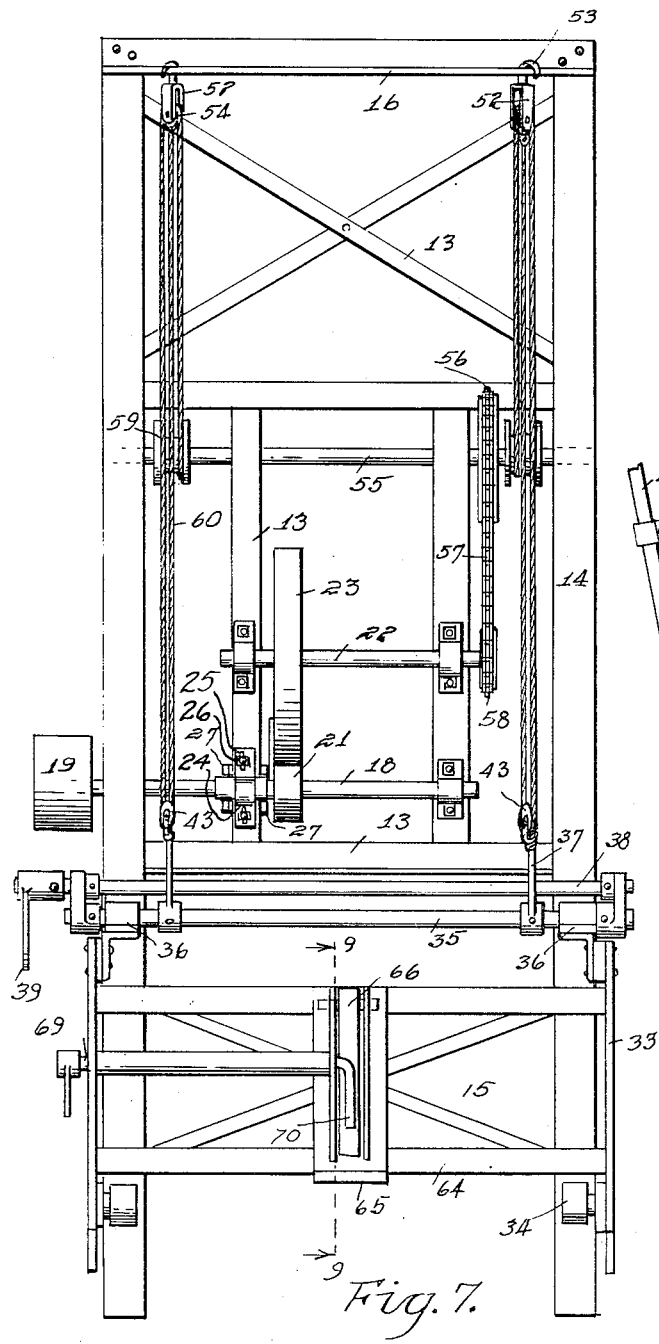
Figure 7 shows an enlarged front view of my device, the rake being omitted.

That part of the tractor shown is indicated by the numeral 10 and its power take-off shaft by 11. A pulley 12 is fixed to the shaft.

My improvement comprises a frame 13 having two uprights 14 connected by braces 15. An angle bar 16 is fixed to the top of the uprights 14. At the lower end of the frame is a rearwardly extended brace 17 to be fixed to the tractor. Mounted on the frame 13 is a shaft 18 having a pulley 19 connected by a belt 20 with the pulley 12 of the tractor. A friction wheel 21 is fixed to the shaft 18.

A shaft 22 is mounted on the frame 13 above and parallel with the shaft 18, and has a friction wheel 23 thereon to coact with the friction wheel 21. The bearings 24 of the shaft 18 are formed with slots 25 for the bolts 26, to permit a slight vertical movement of the shaft (Fig. 7).

Figure 8:
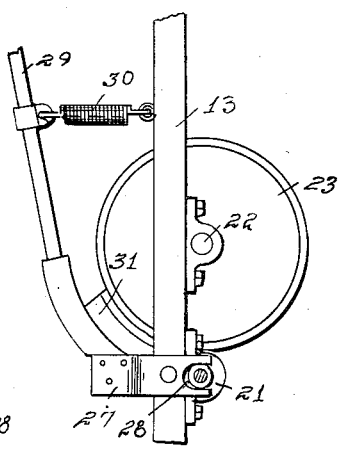
Figure 8 shows a detail side view of the lever-controlled means for raising the rake and supporting it and for controlling its lowering movement.

For moving the friction wheel 21 into and out of operative engagement with the friction wheel 23, I have provided a lever 27 fulcrumed to the frame member 13, see Fig. 8. This lever has an arm on each side of the member 13 and the arms are slotted at 28 to receive the shaft 18. A lever handle 29 is fixed to the lever 27, and it extends upwardly. A spring 30 is attached to the handle 29 and to the frame 13 to hold the lever forwardly. Fixed to the lever 29 is a brake shoe 31 for engagement with the friction wheel 23. When the parts are in the position shown in Fig. 8 the spring holds the brake shoe in engagement with the friction wheel 23 and the friction wheel 21 away from frictional engagement with the friction wheel 23. A cable 32 is attached to the lever handle 29 and extended rearwardly, so that it may be pulled from the driver's seat of the tractor to thereby move the friction wheel 21 into engagement with the friction wheel 23, and the brake shoe 31 away from the friction wheel 23.

Figure 9:
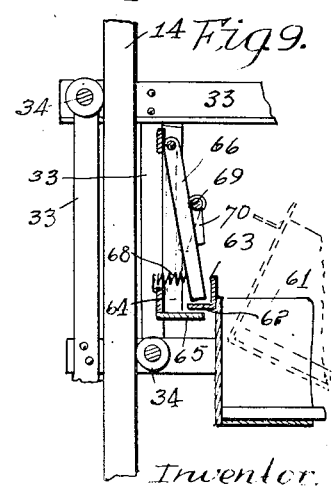
Figure 9 shows a detail side view, partly in section, showing a manure-loading scoop and a part of its supporting frame. The dotted lines show it in dumping position.

For supporting the hay rake I have provided a frame 33 having guide rollers 34 for engaging the uprights 14 and permitting free vertical movement of the frame 33. At the upper end of the frame 33 is a rock shaft 35 mounted in the bearings 36 (Figs. 7 and 9). At the end portions of the shaft 35 are two arms 37 fixed to the shaft 35. Rotatably mounted in the arm 37 is a shaft 38, and fixed to this shaft 38 is an arm 39, to which a cable 40 is attached. Fixed to the shaft 35 are two arms 41, and a link 42 is pivoted to each arm. A pulley 43 is carried by the upper end of each arm. Fixed to the shaft 38 are two lugs 44. As shown in Fig. 5, these lugs extend downwardly, and as shown in Fig. 6, and after the shaft has been rocked, they extend upwardly. The rake 45 is of ordinary construction and is pivoted at 45a to the forwardly extended arms 45b of the frame 33, and has two hooked arms 46 at its rear upper portion, which are extended rearwardly. Each hooked arm has a downwardly extended portion 47 at its front end. A bolt 48 extends through the part 47 and is fixed to the rake. A spring 49 on the bolt urges the part 47 toward the upright of the rake, as shown in Fig. 5. These hooked arms are so shaped and positioned that, as shown in Fig. 5, they are hooked to the shaft 38, and when the latter is rotated to the position shown in Fig. 6, the lugs 44 will engage the hooks and move them upwardly to disconnect them from the shaft 38. The purpose of the springs 49 is to permit a limited tilting movement of the rake tines, as illustrated by dotted lines in Fig. 1, when being used as a rake.

Above the upright guides 14 is an extension frame having guides 50 similar to the guides 14, and at its top is an angle bar 51. Two pulley housings 52 are provided; each has a hook 53 at its top to engage the angle bar 16, as shown in Fig. 7, or the angle bar 51, as shown in Fig. 1. A pulley 54 is mounted in each housing.

Mounted on the frame 13 is a shaft 55 having a sprocket wheel 56 connected by a sprocket chain 57 with a sprocket wheel 58 on the shaft 22. On this shaft 55 are two pulleys 59. At each side of the frame is a cable 60, one end of which is fixed to and wound upon the adjacent pulley 59, then over the pulley 54, then under the pulley 43, and its other end is attached to the pulley housing 52.

In practical use, and when used for hay raking and stacking and when in the position shown in Fig. 1, the tractor is advanced and hay is raked in the ordinary manner. During this time the rake tines have a limited up and down movement on their pivot center, so that they may float on the ground surface. When the rake is full it is desirable to elevate it a short distance. This is accomplished by the driver of the tractor by moving the lever handle 29 rearwardly. This moves the friction wheel 21 into frictional engagement with the friction wheel 23 and at the same time releases the friction brake 31, hence, power from the shaft 18, which is constantly driven by the tractor engine, is delivered to the shaft 55, and the cables are wound up to the desired elevation of the rake. The tractor is then driven to the hay stack, then the rake is further elevated in the same manner to dumping position. When in dumping position the operator pulls the cable 40, this rocks the shaft 38 and causes the lugs 44 to push the hooked arms 47 up and out of engagement with the shaft 38, and the weight of the load tilts the rake to dumping position. When lowering the rake the operator pulls the lever 29 rearwardly far enough to partially release the friction brake, but not far enough to bring the friction wheel 21 into engagement with the friction wheel 23. In this manner the weight of the rake causes it to move down, but the operator has full control of the speed of such movement. All movement of the rake is controlled by a single lever, and if that lever at any time was released by the operator accidentally, or otherwise, all up and down movement of the rake is instantly stopped and the rake firmly supported in such position, thereby preventing accidental dropping of the rake. When the rake in its dumping position is lowered to the ground, the rake tines will engage the ground and the rake will be guided thereby to raking position. When this position is reached the cables will be slack, and the weight of the pulleys 43 will move the arms 41 to the position shown in Fig. 5, at the same time the hooked arms 47 will engage the shaft 38, as shown in Fig. 5, and the rake is again ready for a raking operation. All of said operations are automatic and require no attention by the operator.

My device is useful also as a manure loader, and when used for this purpose the upper guides 50 are removed and the pulley housings 52 are hooked to the angle bar 16, as shown in Fig. 7.

The manure scoop 61, shown in Fig. 3, is of ordinary construction and is pivoted to the arms 45b in the same manner as the hay rake is pivoted.

I have, however, provided a modified form of device for releasing the scoop to dumping position. At the rear upper central portion of the scoop is a trip plate having a rearwardly extended portion 62 and an upwardly extended portion 63. Fixed to the frame 33 is a stop plate 64, having a forwardly extended portion 65 below the plate 62, as shown in Fig. 9. A trip arm 66 is pivoted at 67 to the frame 33, and extends downwardly between the plates 63 and 64. A spring 68 yieldingly holds it forwardly toward the plate 63, and for moving it rearwardly I have provided a shaft 69 pivoted to the frame 33 and having an arm 70 in front of the arm 66. On the end of the shaft 69 is an arm 71 to which a cable 72 is attached.

With this form of device, and when it is desired to dump, the operator pulls the cable 72, this moves the trip arm 66 rearwardly against the pressure of the spring 68, thereby releasing the scoop. This trip device is automatically set to locked position when the scoop is lowered to the ground, and guided to horizontal position with the trip arm 66 over the trip plate 62.

I claim as my invention:

1. An implement of the class described, comprising an upright frame, a carriage vertically movable on said frame, a hay rake pivotally supported adjacent its lower end on said carriage, hooked arms carried on said hay rake and extended rearwardly thereof, a rock shaft on said carriage in position to be engaged by said hooked arms to hold said rake in loading position, lugs fixed to the rock shaft to engage and move the hooked arms free from the rock shaft when said rock shaft is rotated in one direction, and manually operated means for rotating said rock shaft in said one direction.

2. An implement of the class described, comprising an upright frame, a carriage vertically movable on said frame, a hay rake pivotally supported on the carriage so that its tines tend to tilt downwardly, hooked arms carried by the hay rake and extended rearwardly, a rock shaft on the carriage in position to be engaged by said hooked arms when the rake is in loading position, lugs fixed to the rock shaft to engage the hooked arms and move them to position free from the rock shaft when said rock shaft is rocked, and manually operated means for rocking said rock shaft, each of said hooks having a downwardly extended arm at its forward end, a bolt extended through said arm, and a spring on the bolt, said bolt being secured to the hay rake and whereby a tilting movement of the hay rake is permitted with the hooked arms in yieldable engagement with said shaft.

3. An implement of the class described, comprising an upright frame, a carriage vertically movable on said frame, a hay rake pivotally supported on the carriage so that its tines tend to tilt downwardly, hooked arms carried by the hay rake and extended rearwardly, a shaft rotatably supported by said carriage and having upwardly extended arms, a rock shaft supported by said arms, lugs carried by the rock shaft for engaging and releasing the hooked arms as the shaft is rocked, crank arms fixed to said rotatable shaft and means for elevating the rake connected to said crank arms, said parts being so shaped and arranged that when the elevating means is pulled upwardly, said rock shaft will be at its rearward limit of movement, and when released, the weight of the rake will cause the hooked arms to move the rock shaft to its forward limit with the hooked arms engaging the rock shaft when in all positions of said movement, and manually operable means for rocking the rock shaft.

GILBERT E. COATES.